United States Patent [19]

Jinbo

[11] Patent Number: 4,990,384
[45] Date of Patent: Feb. 5, 1991

[54] PAPER COOK POT

[75] Inventor: Takeshi Jinbo, Matsudo, Japan

[73] Assignee: Somar Corporation, Japan

[21] Appl. No.: 338,207

[22] Filed: Apr. 14, 1989

[51] Int. Cl.$^5$ ............................ B32B 27/12; B32B 27/34
[52] U.S. Cl. .................................... 428/36.1; 220/401;
220/455; 220/458; 220/493; 426/113; 426/114;
428/35.7; 428/334; 428/336; 428/473.5;
428/474.4; 428/920; 428/921
[58] Field of Search .................... 428/35.7, 36.1, 36.4,
428/289, 290, 480, 481, 482, 483, 473.5, 474.4,
334, 336, 920, 921, 34.2, 475.2; 426/113, 114;
220/458, 455, 459

[56] References Cited

U.S. PATENT DOCUMENTS

| Re.32,270 | 10/1986 | Murray, Jr. | 428/34.2 |
| 416,711 | 12/1889 | Bryan | 220/401 |
| 734,054 | 7/1903 | Frost | 220/401 |
| 927,521 | 7/1909 | Gelg | 220/485 |
| 2,027,296 | 1/1936 | Stuart et al. | 428/34.2 |
| 2,407,118 | 9/1946 | Waters | 93/49 |
| 3,549,789 | 12/1970 | Haroldson | 174/122 |
| 3,756,908 | 9/1973 | Gross | 162/146 |
| 3,904,104 | 9/1975 | Kane | 229/3.5 |
| 3,924,013 | 12/1975 | Kane | 428/481 |
| 4,026,458 | 5/1977 | Morris et al. | 220/458 |
| 4,147,836 | 4/1979 | Moddleton et al. | 428/34.2 |
| 4,247,038 | 1/1981 | Forbes | 229/32 |
| 4,349,124 | 7/1982 | Fallen | 220/458 |
| 4,391,833 | 7/1983 | Self et al. | 428/481 |
| 4,435,344 | 3/1984 | Ioka | 428/34.2 |
| 4,491,502 | 1/1985 | Martin | 162/146 |
| 4,528,975 | 7/1985 | Wang | 220/485 |
| 4,543,280 | 9/1985 | Fujita et al. | 428/475.2 |
| 4,576,842 | 3/1986 | Hartsing et al. | 428/473.5 |
| 4,631,046 | 12/1986 | Kennedy | 428/34.2 |
| 4,678,703 | 7/1987 | Shibasaki | 428/288 |
| 4,775,560 | 10/1988 | Katsura et al. | 428/34.2 |

FOREIGN PATENT DOCUMENTS

| 2412335 | 3/1973 | Fed. Rep. of Germany . |
| 0077261 | 7/1978 | Japan . |
| 123871 | 3/1919 | United Kingdom . |
| 1086551 | 3/1964 | United Kingdom . |

Primary Examiner—Ellis P. Robinson
Assistant Examiner—Archene A. Turner
Attorney, Agent, or Firm—Lorusso & Loud

[57] ABSTRACT

A cook pot formed from a sheet which includes a fibrous web formed of a flame retardative synthetic resin, and a water-impermeable layer integrally formed on at least one side of the web. The cook pot has a bottom wall and a side wall extending upwardly about the periphery of the bottom wall.

3 Claims, 1 Drawing Sheet

PAPER COOK POT

BACKGROUND OF THE INVENTION

This invention relates to a cook pot or pan formed from a synthetic paper.

Known disposable cook pots are generally formed of an aluminum film or a thick, treated paper. They are not, however, commercially available at low prices because of the expensiveness of the raw material per se. Another reason for the expensiveness of paper cook pots is because of a difficulty of bending or folding a thick paper into pots.

SUMMARY OF THE INVENTION

It is an object of the present invention to provide a disposable, light weight, safe, easy to fabricate and inexpensive cook pot.

In accomplishing the foregoing object, there is provided in accordance with the present invention a cook pot formed from a sheet which includes a fibrous web formed of a flame retardative synthetic resin, and a water-impermeable layer integrally formed on at least one side of the web. The cook pot has a bottom wall and a side wall extending upwardly about the periphery of the bottom wall.

The cook pots or pans according to the present invention are suitably used in restaurants, hotels, etc. for cooking, on a dining table, dishes served in the pot, such as "shabu-shabu", a famous Japanese dish.

BRIEF DESCRIPTION OF THE DRAWINGS

Other objects, features and advantages of the present invention will become apparent from the detailed description of the preferred embodiments of the present invention when considered in light of the accompanying drawings, in which.

DESCRIPTION OF THE PREFERRED EMBODIMENT

Figure 1:
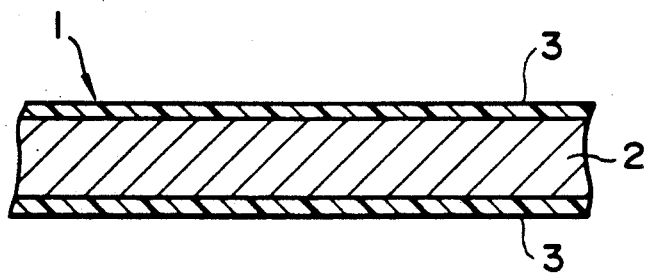
FIG. 1 is a sectional view schematically showing a synthetic paper from which a cook pot of the present invention is formed.

Referring first to FIG. 1, designated generally as 1 is a synthetic paper sheet from which cook pots according to the present invention are to be formed. The sheet 1 is composed of a fibrous web 2 formed of a flame retardative synthetic resin, and a water-impermeable or waterproof layer 3 integrally formed on each side of the web 2.

The sheet is preferably obtained by a method which includes the steps of providing a fibrous web formed of a flame retardative synthetic resin, and calendering the web at a temperature and under a pressure sufficient to fuse the surface of each side of the web and to form a water-impermeable, continuous surface layer on each side of the web. The fibrous web may be obtained by, for example, processing short fibers (flock) formed of a synthetic resin together with minute fibrous binders (fibrid) formed of a similar synthetic resin with a paper making machine to form a paper-like structure in which the fibrids are bound with each other to form a continuous film in the interstices between the flocks.

The synthetic resin to be used for the formation of the synthetic paper sheet is preferably an aromatic polyamide or a polyimide such as customarily used as a lining material for frying pans. The sheet preferably has a thickness of about 20–250 $\mu$m, more preferably 35–100 $\mu$m and the thickness of each of the surface, water-impermeable layers is preferably at least 3 $\mu$m, more preferably at least 10 $\mu$m.

The cook pot according to the present invention includes a bottom wall and a side wall extending upwardly about the periphery of the bottom wall. The pot generally has a bottom diameter of about 7–25 cm, a top diameter of about 10–40 cm, a height of about 5–15 cm.

The cook pot can be fabricated from the abovedescribed synthetic resin sheet in a polygonal or a circular shape by folding, press-molding or the like method. If desired, a suitable support, such as a wire basket, adapted for supporting engagement with the outer surface of the pot may be used for reinforcing the pot, and for preventing deformation of the pot during cooking.

Figure 2:
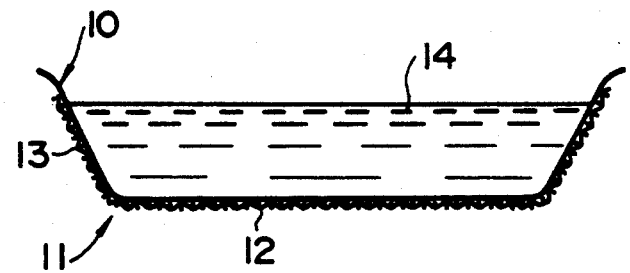
FIG. 2 is an elevational, cross-sectional view diagrammatically showing one embodiment of a cook pot according to the present invention.

FIG. 2 illustrates one embodiment of the cook pot of the present invention. Designated generally as 11 is a wire net basket having a bottom wall 12 polygonal or circular in shape and a side wall 13 upwardly extending from the periphery of the bottom wall 12. Disposed within the basket 11 is a cook pot 10 formed of a synthetic paper. The pot 10 is formed by deforming a sheet as shown in FIG. 1 in conformity with the inside surface of the basket 11. Since the sheet is thin and flexible, it can be easily shaped into the pot. When the thus constructed pot 10 is heated with a burner or the like heater after water or soup 14 has been poured thereinto, the contents 14 in the pot 10 can be boiled without burning of the pot 10. After cooking, the pot 10 can be removed from the basket 11 and replaced by a fresh pot.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A cook pot formed from a sheet having a thickness of 20–250 $\mu$m and comprising a fibrous web formed of a flame retardative polyimide or aromatic polyamide and a continuous water-impermeable surface layer of said polyimide or polyamide having a thickness of at least 3 $\mu$m and integrally formed on at least the side of said web forming the interior surface of said cook pot, said continuous water-impermeable layer formed by calendering said web at a temperature and under a pressure sufficient to fuse said surface of said web, said cook pot having a bottom wall and a side wall extending upwardly about the periphery of said bottom wall.

2. A cook pot according to claim 1, further comprising a support member surrounding the outer surface of the side and/or bottom wall.

3. A cook pot according to claim 2, wherein said support member is a wire net basket.

* * * * *